Patented Jan. 8, 1929.

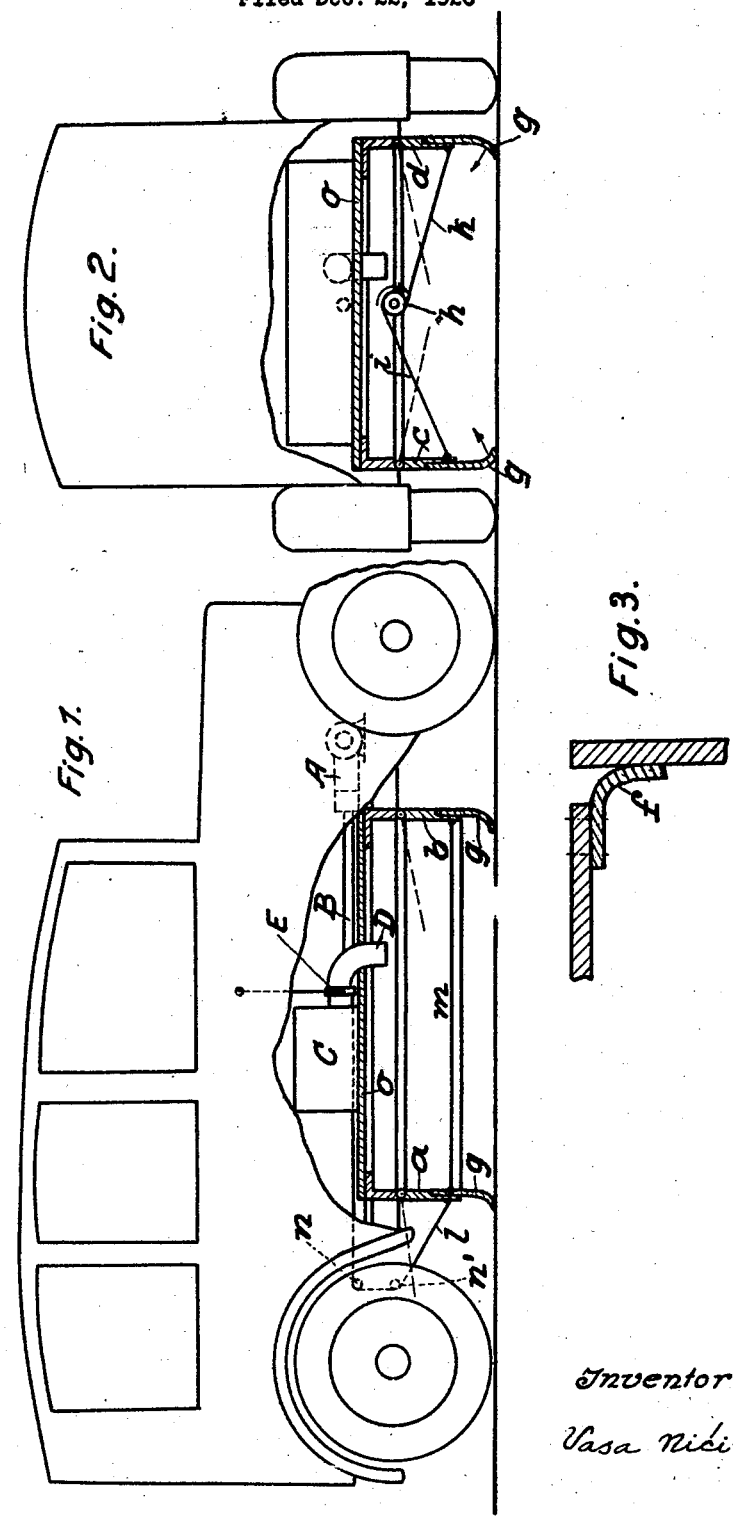

1,698,482

UNITED STATES PATENT OFFICE.

VASA NIĆIN, OF DRESDEN, GERMANY.

MOTOR VEHICLE.

Application filed December 22, 1926, Serial No. 156,498, and in Germany December 28, 1925.

My present invention relates to motor vehicles, and has for its object to provide a device for increasing the pressure of the wheels of a motor vehicle on the road. This is attained by reducing the air pressure below the vehicle by means of an exhauster or other suitable device, as the vehicle is then pressed down onto the road by the outer air. This affords greater security against upsetting in curves. The adhesion between the wheels of the vehicle and the road, which is proportional to the pressure, is also hereby increased, which also lessens the danger of skidding in general and particularly within curves. The increased adhesion further allows quicker stopping, seeing that sharper braking is rendered possible without the wheels sliding. Furthermore the increased adhesion assures the transmission of greater revolving power, as necessary, for instance, in climbing steep ascents, an advantage which, like the above named as well is likely to be particularly appreciated on slippery and icy streets.

The pressure below atmospheric under the vehicle can be created by a motor-run exhauster properly built into the car or by any other suitable device. In order to create and maintain the desired under-pressure with as small an exhauster and as little energy as possible, the air space below the car must be confined somehow, for instance, by means of removable lateral walls. It is also provided to obtain the under-pressure within the space thus temporarily formed by connecting this temporary chamber underneath the car to a specially provided vacuum chamber on the car, from which the air has been exhausted previously and preferably automatically during the ordinary run of the car and in just the same manner in which the electric batteries are being continuously charged.

One application of the invention is shown in the drawings by way of example.

Fig. 1 is an elevation, partially in section. Fig. 2 is a rear view of the car shown in Fig. 1 with certain parts in section. Fig. 3 shows in a detail view a flexible connection between two chamber walls.

Figs. 1, 2 and 3 show the side walls in working position. All four compartment walls $a, b, c, d$, are attached to the frame in such a manner that they can be raised and let down. To form a top cover within these walls, the car frame is provided with a horizontal wall $o$. In order to render the thus formed compartment underneath the vehicle as air tight as possible, the compartment walls are provided on their lower edges and along their entire length with a heavy broad strip $g$ of rubber or other elastic material, the width of which is so determined, that, when let down, the wall of the rubber strip, on account of its dimensions, is bent in such manner as shown in Figs. 1 and 2, and as a result of its elasticity is pressed onto the road, whereby a particularly air-tight compartment is obtained.

Fig. 3 shows how two contiguous compartment walls are rendered air-tight at point of junction. The walls are fitted at their perpendicular end edges with a suitable, broad rubber strip $f$, which is of such dimensions that it lies against the other wall, being at the same time considerably bent on account of its width and accordingly well pressed against the other wall on account of its bending resistance, in such a manner that thereby a perfectly air-tight jointure is assured.

In general, when not in use, the compartment walls rest in the positions indicated by the dashed lines. Whenever a change of pressure below the car is to be created, the walls are let down.

Figures 1 and 2 show the walls $a, b, c, d$, in working position. The raising of same after use is operated from the chauffeur's seat. By turning the roller $h$ to the right by means of a lever not shown, ropes $i$ and $k$ are being wound up on said roller $h$ and a raising of the walls $c$ and $d$ is produced thereby. The walls $a$ and $b$ are interconnected by means of a rod $m$. When the rope $l$ passing over the rollers $n'$, $n$ is drawn tight, for instance by means of the lever actuating said above named roller $h$ and not especially indicated, the walls $a$ and $b$ are inconsequence raised jointly. The walls are let down on account of their own weight on loosening the ropes $i$, $k$ and $l$. The exhauster A is connected by means of a pipe B with the tank C. A pipe D connected with a valve E leads from C to below the car. In C is maintained a vacuum by means of exhauster A. In case of necessity valve E may be opened, so that the air pressure underneath the car is being reduced by the vacuum within C.

As a matter of course, I may just as well use the temporary compartment below the car for partially lifting the car by filling the compartment with compressed air, for instance, from the tank C, and thus prevent the car from settling or sinking into soft ground.

What I claim as my invention and desire to secure by Letters Patent of the United States is:—

1. In a motor vehicle, a device for influencing the pressure between the car and the road, and comprising, in combination, a chamber arranged between the front and rear wheels of the vehicle and covering at least 50 per cent of the road surface between the wheels, said chamber having removably mounted lateral walls, said lateral walls being adapted to coact with the surface of the road in confining the space enclosed by said chamber, means for altering the air pressure within said confined space, and means for moving said lateral walls.

2. In a motor vehicle, a device for influencing the pressure between the car and the road, and comprising, in combination, a chamber arranged between the front and rear wheels of the vehicle and covering at least 50 per cent of the road surface between the wheels, said chamber having removably mounted lateral walls, said lateral walls being adapted to coact with the surface of the road in confining the space enclosed by said chamber, within said chamber a separate compartment communicating with the interior of said chamber, means for rendering the air pressure within said separate compartment different from atmospheric air pressure, and means for moving said lateral walls.

VASA NIĆIN.